US008692999B1

(12) United States Patent
Olczak (10) Patent No.: US 8,692,999 B1
(45) Date of Patent: Apr. 8, 2014

(54) CROSSTALK CANCELLATION FOR A SIMULTANEOUS PHASE SHIFTING INTERFEROMETER

(75) Inventor: Eugene Olczak, Pittsford, NY (US)

(73) Assignee: Exelis, Inc., McLean, VA (US)

( * ) Notice: Subject to any disclaimer, the term of this patent is extended or adjusted under 35 U.S.C. 154(b) by 357 days.

(21) Appl. No.: 13/167,078

(22) Filed: Jun. 23, 2011

(51) Int. Cl.
*G01B 9/02* (2006.01)

(52) U.S. Cl.
USPC .......................................... 356/450; 356/512

(58) Field of Classification Search
USPC ...................... 356/450–521, 124.5
See application file for complete search history.

(56) References Cited

U.S. PATENT DOCUMENTS

| 4,594,003 | A | | 6/1986 | Sommargren |
| 5,076,695 | A | | 12/1991 | Ichihara |
| 5,473,434 | A | | 12/1995 | deGroot |
| 5,636,025 | A | | 6/1997 | Bieman |
| 5,818,588 | A | * | 10/1998 | Matsumoto et al. .......... 356/487 |
| 6,344,898 | B1 | | 2/2002 | Gemma |
| 6,856,405 | B2 | | 2/2005 | Tang |
| 7,030,995 | B2 | | 4/2006 | De Groot |
| 7,230,717 | B2 | | 6/2007 | Brock |
| 2012/0166128 | A1 | * | 6/2012 | Ikhlef et al. ................... 702/104 |

OTHER PUBLICATIONS

Malacara, D., Optical Shop Testing, Chapter 14, Wiley, New York (1992).
Millerd, J. et al., "Pixelated Phase-Mask Dynamic Interferometer," 4D Technology Corporation, 2004.
Zhang et al., "Models of Multiple Wavelength Phase Camera (MWPC) for JWST Ground Alignment," Oct. 20, 2005.

* cited by examiner

*Primary Examiner* — Tarifur Chowdhury
*Assistant Examiner* — Michael P Lapage
(74) *Attorney, Agent, or Firm* — RatnerPrestia (57) ABSTRACT

A method of minimizing fringe print-through in a phase-shifting interferometer, includes the steps of: (a) determining multiple transfer functions of pixels in the phase-shifting interferometer; (b) computing a crosstalk term for each transfer function; and (c) displaying, to a user, a phase-difference map using the crosstalk terms computed in step (b). Determining a transfer function in step (a) includes measuring intensities of a reference beam and a test beam at the pixels, and measuring an optical path difference between the reference beam and the test beam at the pixels. Computing crosstalk terms in step (b) includes computing an N-dimensional vector, where N corresponds to the number of transfer functions, and the N-dimensional vector is obtained by minimizing a variance of a modulation function in phase shifted images.

13 Claims, 5 Drawing Sheets

FIG. 6

CROSSTALK CANCELLATION FOR A SIMULTANEOUS PHASE SHIFTING INTERFEROMETER

STATEMENT REGARDING FEDERALLY SPONSORED RESEARCH

The invention described herein was made in the performance of work under NASA Contract No. jwst-z9005-10-0005477 and is subject to the provisions of Section 305 of the National Aeronautics and Space Act of 1958 (42 U.S.C. 2457).

FIELD OF THE INVENTION

The present invention relates generally to precision optical metrology instrumentation for imaging and analysis of surfaces. More particularly, the present invention relates to interferometer-based systems and methods for the profiling of surface topography.

BACKGROUND OF THE INVENTION

Among the most widely-used instruments for measuring surface topographies are interferometers, which use the wave nature of light to map variations in surface height with a high degree of accuracy. It is generally accepted in the art that the most accurate interferometers are based on the principle of phase shifting. Modern phase-shifting interferometers are typically comprised of an optical system, an electronic imaging system, a computer-based or otherwise automated controller, and means for introducing a reference phase shift.

Phase shifting interferometry (PSI), for example, is described in detail in Chapter 14 of a book entitled Optical Shop Testing, edited by Daniel Malacara (Wiley, New York, 1992). Briefly described, PSI typically involves electronic storage of intensity patterns measured for a sequence of three or more reference phase shifts. These stored intensity patterns are then analyzed, as by a computer-based digital signal processor, to recover the original wavefront phase through analysis of the variations of intensity as a function of phase shift. When such PSI-based instruments are properly adjusted, they are capable of measuring surface topography with a resolution on the order of one-thousandth the wavelength of light.

An interferometric wavefront sensor employing phase-shifting interferometry typically consists of a light source that is split into two wavefronts, namely, reference and test wavefronts, that are recombined after traveling through different paths. The relative phase difference between the two wavefronts is manifested as a two-dimensional intensity pattern known as an interferogram. Phase-shift interferometers typically have an element in the path of the reference or the test wavefront which introduces three or more known phase steps or phase shifts. By detecting the intensity pattern with a detector, at each of the phase shifts, the phase distribution of the object wavefront can be quantitatively calculated independent of the relative energy in the reference wavefront or object wavefront.

Phase shifting of a light beam can either be accomplished by sequentially introducing a phase step (temporal phase shifting) or by splitting the beam into parallel channels for simultaneous phase steps (spatial phase shifting). Spatial phase shifting achieves data acquisition in a time period that is several orders of magnitude less than temporal phase shifting, thus offering immunity to vibration.

U.S. Pat. No. 7,230,717, issued Jun. 12, 2007, describes how a pixilated phase-mask can be used as an interferometer to measure optical path-length differences at high-sped, with a single detector array. Portions of this Patent are described below with reference to FIGS. 1 and 2.

Figure 1:
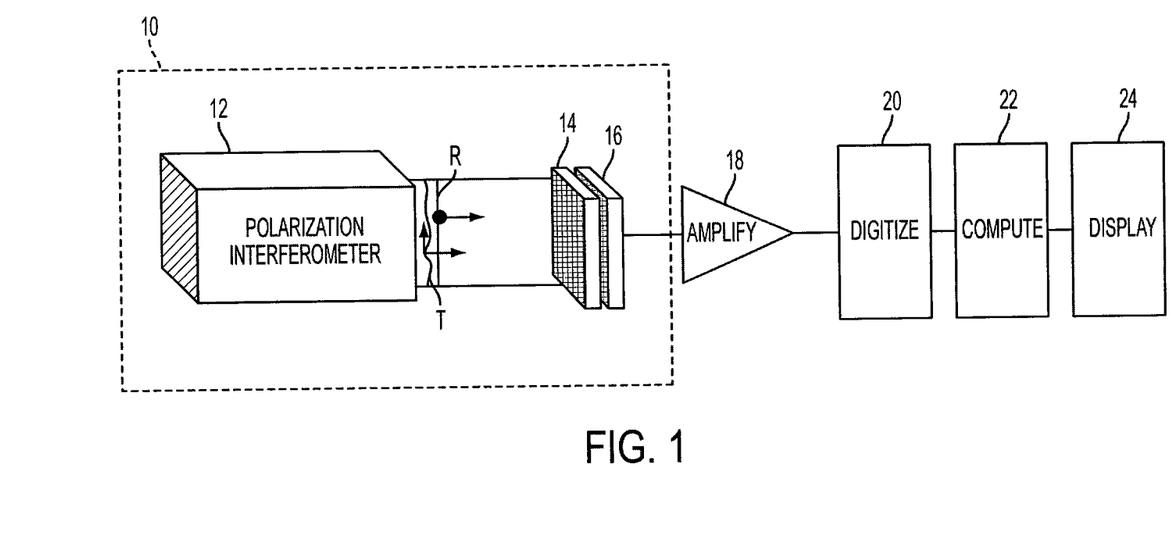
FIG. 1 is a measurement system using an interferometer to generate reference and test wavefronts for testing an object under test.

With reference to FIG. 1, a complete measurement system 10 is shown. The system consists of a polarization interferometer 12 that generates a reference wavefront R and a test wavefront T having orthogonal polarization states (which can be linear as well as circular) with respect to each other; a pixilated phase mask (PPM) 14 that introduces an effective phase-delay between the reference and test wavefronts at each pixel and, subsequently, interferes the transmitted light; and a detector array 16 that converts the optical intensity sensed at each pixel to an electrical charge. The measurement system 10 also includes an amplifier 18 that converts the electrical charge to a voltage, a digitization circuit 20 that converts the voltage to a digital bit stream, a computer 22 that processes the digital bit stream to calculate optical phase difference, and a display 24 that conveys the result in visible form and permits user interaction.

The PPM 14 has an effective pixel pitch or spacing that is identical to, or an integer multiple of, the pixel pitch of the detector array 16. Additionally, the PPM 14 is rotationally and axially aligned with respect to the detector array 16, so that the effective pixels of the pixilated phase-mask and the pixels of the detector array are substantially coincident across the entire surface of each.

The PPM 14 and detector array 16 may be located in the same image plane, or positioned in conjugate image planes. The PPM can be directly deposited over, or affixed onto detector array 16, or can be mechanically registered and separated by a small gap.

Figure 2:
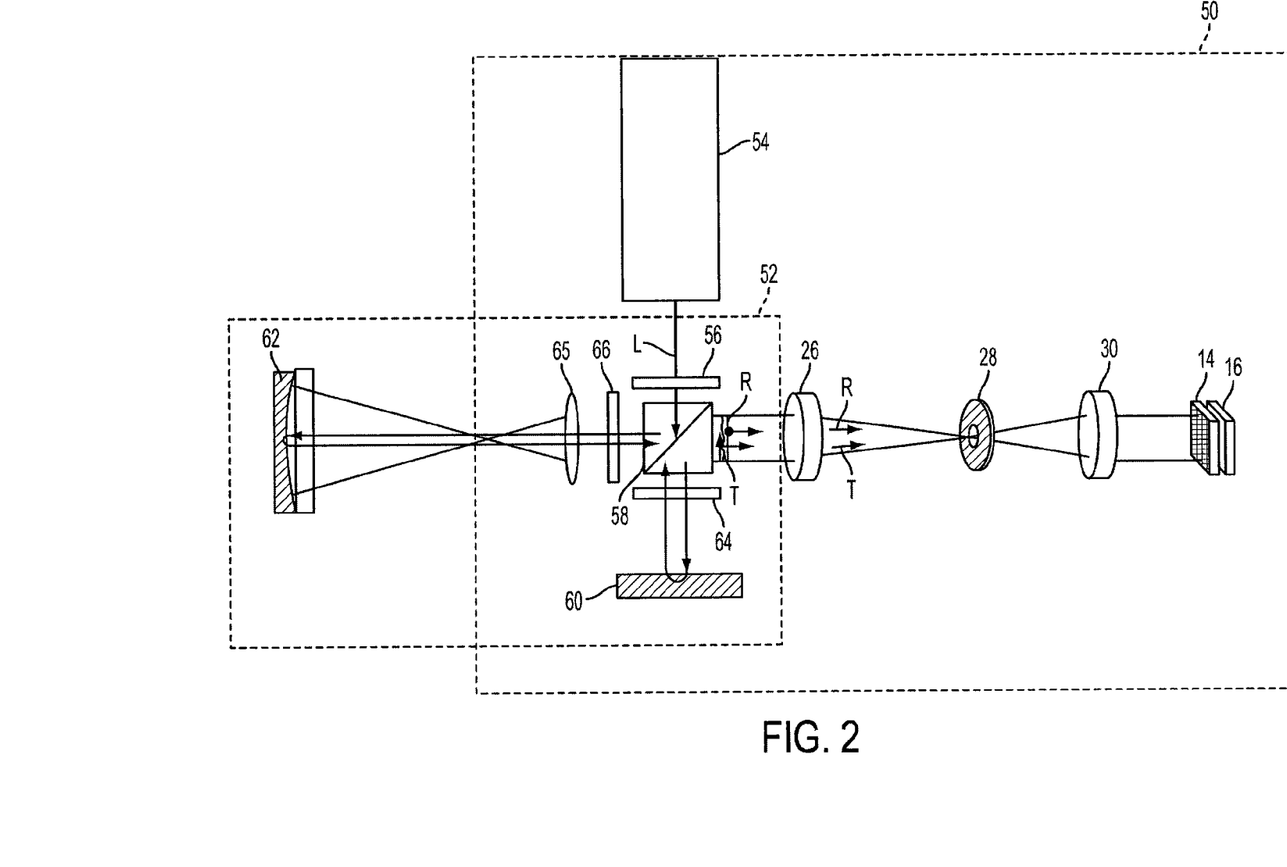
FIG. 2 is a measurement system using a pixilated phase mask and a detector array to test a mirror.

A complete measurement system 50 is illustrated in FIG. 2, wherein the pixelated phase-mask (PPM) 14 is used in conjunction with a Twyman-Green interferometer 52. A linearly polarized beam L from a light source 54 is combined with a half-wave plate 56 to produce a linearly polarized beam of desired polarization angle directed to a polarizing beam splitter 58, which in turn generates a reference beam directed toward a reference surface 60 and a test beam directed toward a test surface 62. Both beams are linearly polarized along orthogonal axes. Quarter-wave plates 64 and 66 are used to rotate the test and reference beams, T and R, after reflection while retaining their mutually orthogonal linear polarization states, so that they may be transmitted through and reflected from beam splitter 58, respectively, toward relay optics 26, 28 and 30. A coupling lens 65 is used in combination with test surface 62 to return a substantially collimated test beam T.

As one skilled in the art would readily understand, the pixelated phase-mask (PPM) can similarly be combined in a plurality of other systems designed to carry out particular types of real-time measurement, such as with a Fizeau interferometer, a microscope profilometer, a wave-front sensor, and a strain sensor.

The effective phase-shift of each pixel of PPM 14 can have any spatial distribution; however, it is desirable to have a regularly repeating pattern. One example for the PPM is an arrangement in which neighboring pixels are in quadrature or out-of-phase with respect to each other; that is, there is a ninety-degree, or one hundred eighty degree relative phase shift between neighboring pixels. Many algorithms exist in the art for calculating phase from sampled data in quadrature.

Figure 3:
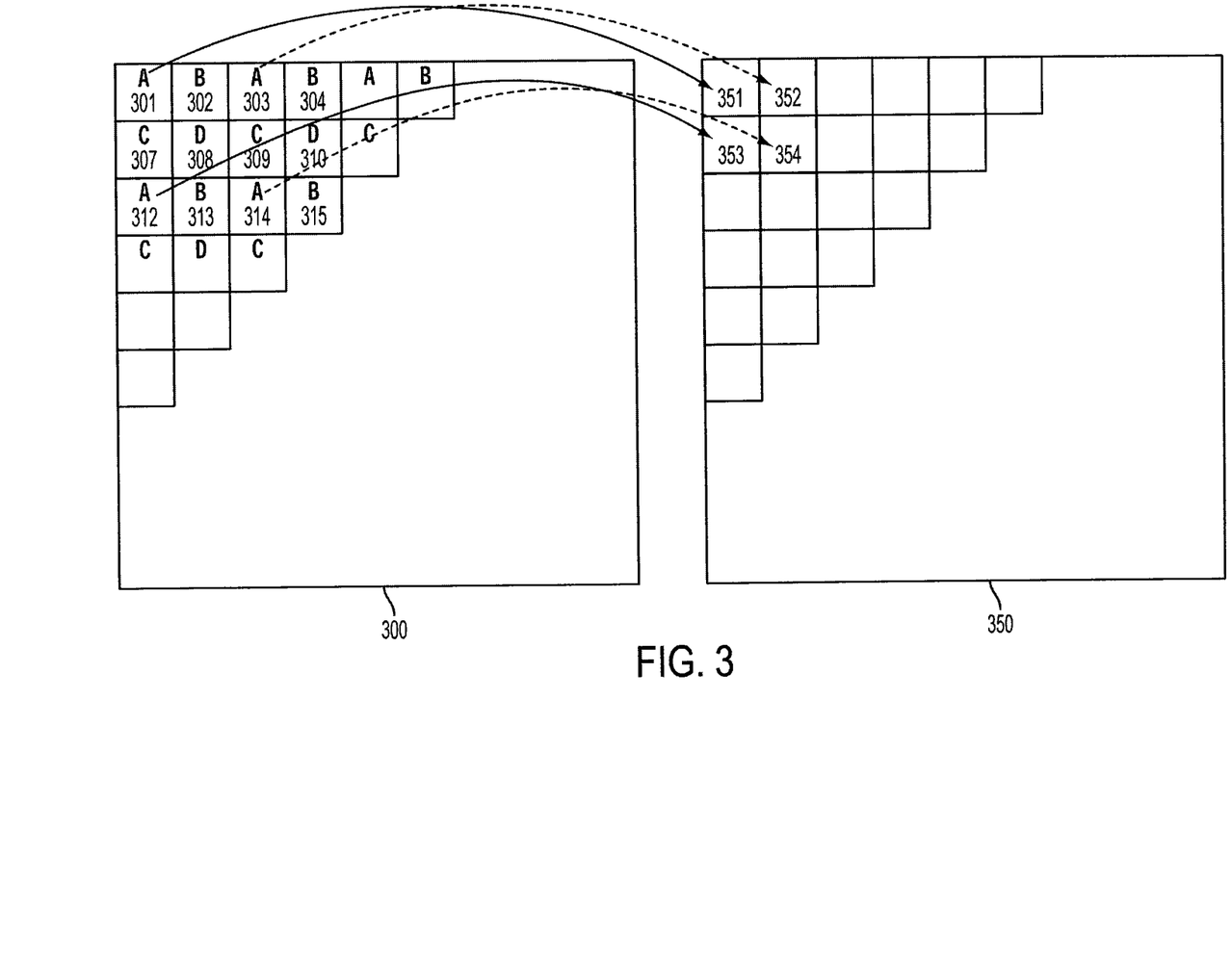
FIG. 3 is an example of synthesizing an interferogram from sets of pixels having similar transfer functions.

FIG. 3 illustrates one possible way of arranging the PPM and the detector pixels and for processing the measured data. The measured array 300 represents the signal measured at each sensor pixel. The capital letters A, B, C and D represent different transfer functions resulting by the filtering from the pixelated phase-mask (the transfer functions are shown labeled 301, 302, . . . and 315.)

The signal measured at each sensor pixel is given by its transfer function, the phase-difference between the reference and test beams, and the amplitude of each beam. For example, one possible configuration is the following:

$$A(x, y) = \frac{1}{2}\left(I_r + I_s + 2\sqrt{I_r I_s} \cos(\Delta\phi(x, y))\right) \quad (1)$$

$$B(x, y) = \frac{1}{2}\left(I_r + I_s + 2\sqrt{I_r I_s} \cos\left(\Delta\phi(x, y) + \frac{\pi}{2}\right)\right) \quad (2)$$

$$C(x, y) = \frac{1}{2}\left(I_r + I_s + 2\sqrt{I_r I_s} \cos(\Delta\phi(x, y) + \pi)\right) \quad (3)$$

$$D(x, y) = \frac{1}{2}\left(I_r + I_s + 2\sqrt{I_r I_s} \cos\left(\Delta\phi(x, y) + \frac{3\pi}{2}\right)\right) \quad (4)$$

where $I_r(x, y)$ and $I_s(x, y)$ are the intensities of the reference and test wavefronts, R and T, at each x, y coordinate in the image, respectively; and $\Delta\phi(x, y)$ is the optical path difference between the reference and test wavefronts.

Multiple interferograms can thus be synthesized by combining pixels with like transfer functions. Referring to FIG. 3, the pixels with transfer functions equal to A can be combined into an interferogram 350. For example, measured intensity pixel 301 is mapped to interferogram pixel 351; intensity pixel 303 to interferogram pixel 352; intensity pixel 312 to interferogram pixel 353; intensity pixel 314 to interferogram pixel 354; and so on. The resulting interferogram 350 is a continuous fringe map that opticians are accustomed to viewing for alignment, which can be displayed on a screen in real-time. The B, C, and D pixels can be similarly combined to produce corresponding interferograms.

The resulting interferograms have a total number of pixels equal to (n×m)/N, where n and m are the numbers of pixels in the detector array in the x and y directions, respectively, and N is the number of different discrete phase-shift elements in the pixelated phase mask 10. In the example of FIG. 3, N is equal to four. The resulting four interferograms can be processed by a variety of algorithms that are well-known in the art for calculating phase difference.

Figure 4:
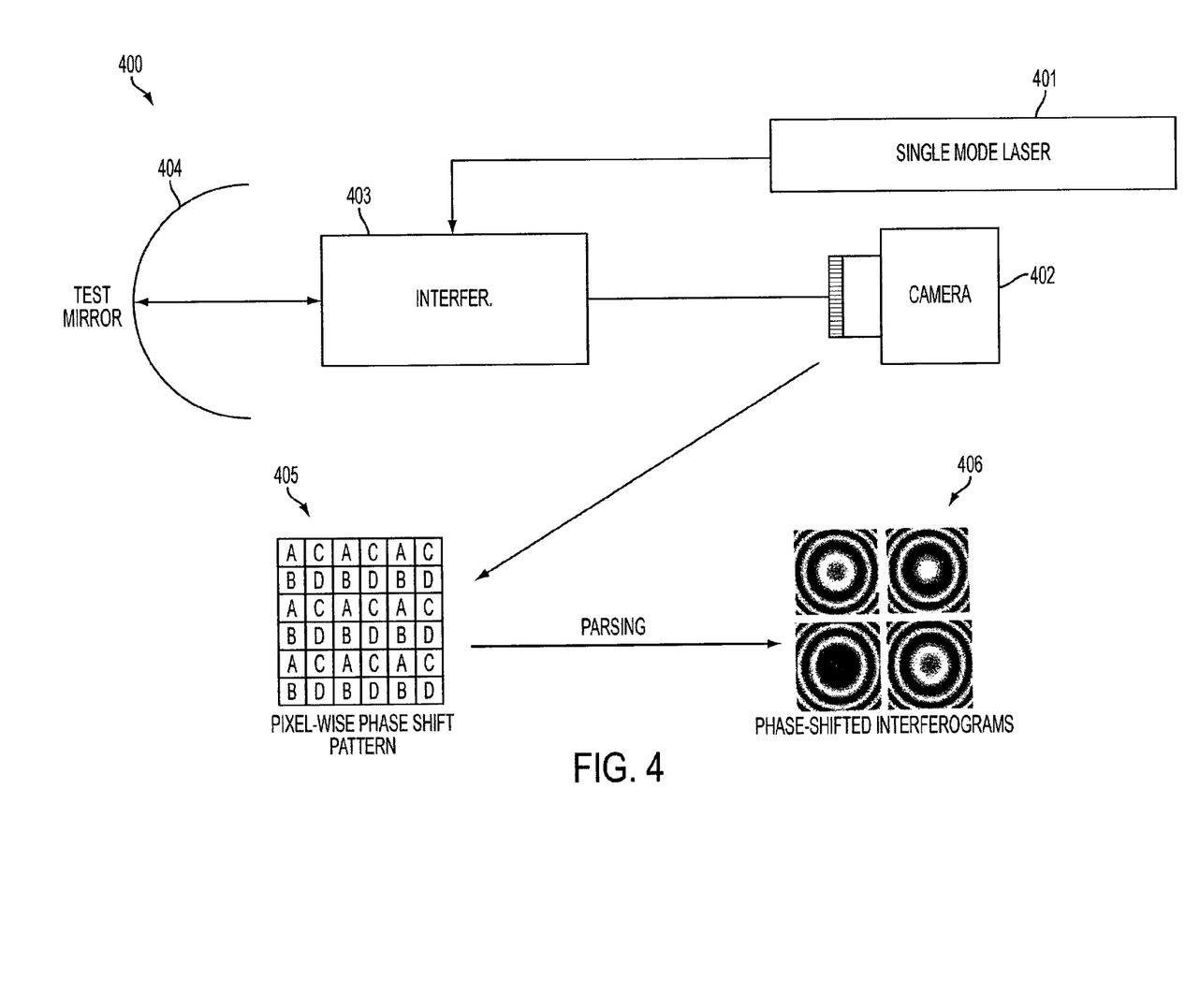
FIG. 4 is an example of a measurement system providing four phase shifted interferograms.

FIG. 4 illustrates four phase-shifted interferograms, generally designated as 406, which are produced by parsing the pixel-wise phase shift pattern 405. It will be appreciated that A, B, C and D shown as pixels may each be based on a single pixel, or a set of multiple pixels.

The phase shift pattern is produced by a measurement system, designated as 400. The measurement system includes a single mode laser 401, a camera 402, interferometer 403 and test mirror 404. The pixels of camera 402 produces the pixel-wise phase shift pattern 405. More detail of measurement system 400 may be obtained by referring to the description of system 50, shown in FIG. 2.

The resulting four interferograms can be processed by a variety of algorithms that are known in the art for calculating phase difference and modulation index. For example, a possible implementation for measuring phase difference is a simple four-bucket algorithm, as follows:

$$\phi(x,y) = \arctan[(A-C)/(D-B)] \quad (5)$$

where $\phi(x, y)$ is the phase, and
A, B, C and D are taken from adjacent neighboring pixels in FIG. 4.

Prior art phase shifting interferometers, which use the four-bucket algorithm, suffer from a measurement defect known as fringe print through. This is a common problem in a four-bucket algorithm, as will as other algorithms. The measurement defect may typically be reduced by taking many measurements of the test hardware, with intentional vibration added to the hardware under test. Adding vibration, however, is not always adequate if the induced vibration is not large enough, random enough, or is not well prescribed. Thus, unacceptable errors may typically result.

The present invention, as will be described, provides a method and an algorithm for reducing the fringe print through and achieving improved results in all simultaneous phase shifting measurements. Improved results may be seen in simultaneous phase shifting (or in polarization phase shifting) wavefront sensors, piston sensors, or interferometers for providing various applications, including system wavefront testing, component surface testing, and speckle testing.

SUMMARY OF THE INVENTION

To meet this and other needs, and in view of its purposes, the present invention provides a method of minimizing fringe print-through in a phase-shifting interferometer. The method includes the following steps: (a) determining multiple transfer functions of pixels in the phase-shifting interferometer; (b) computing a crosstalk term for each transfer function; and (c) displaying, to a user, a phase-difference map using the crosstalk terms computed in step (b). Determining a transfer function in step (a) includes measuring intensities of a reference beam and a test beam at each pixel, and measuring an optical path difference between the reference beam and the test beam at each pixel. Computing crosstalk terms in step (b) includes computing an N-dimensional vector, where N corresponds to the number of transfer functions. The N-dimensional vector is obtained by minimizing a variance of a modulation function.

The method may further include the following step: (d) combining pixels having similar transfer functions to generate a single image per transfer function.

Another embodiment of the present invention is a method of reducing errors in a phase difference-map generated by a camera. The method includes the steps of:
parsing output signals from the camera into four phase shifted images;
forming a modulation image using the four phase shifted images;
minimizing variance (VAR) of the modulation image;
correcting the four phase shifted images using the minimized variance; and
displaying, to a user, a corrected phase-difference-map.

The modulation image, defined as gamma, includes the following relationship:

gamma=2*sqrt((d1−n1Cancel)^2+(n1−d1Cancel)^2))/intensity;

in which:
n1=y1−y3;
d1=y4−y2;
d1Cancel=a(1)*y2+a(2)*y4;
where d1Cancel is a cancellation term, and
a is a vector of the coefficients, y1, y2, y3 and y4;
n1Cancel=a(3)*y1+a(4)*y3;
where n1Cancel is a cancellation term, and
a is a vector of the coefficients, y1, y2, y3 and y4;
intensity=y1+y2+y3+y4; and
y1, y2, y3 and y4 are four phase shifted images.

Yet another embodiment of the present invention is a machine-readable storage medium containing a set of instructions for minimizing fringe print-through in a phase-shifting interferometer. The instructions include the steps of:

(a) determining multiple transfer functions of pixels in the phase-shifting interferometer;

(b) computing a crosstalk term for each transfer function, and (c) displaying, to a user, a phase-difference map using the crosstalk terms computed in step (b).

The machine-readable storage-medium may include the following steps:

(d) forming a modulation function that includes the transfer functions computed in step (a); and (e) minimizing a variance of the modulation function.

It is understood that the foregoing general description and the following detailed description are exemplary, but are not restrictive, of the invention.

BRIEF DESCRIPTION OF THE FIGURES

The invention may be understood from the following detailed description when read in connection with the accompanying figures.

DETAILED DESCRIPTION OF THE INVENTION

As will be explained, the present invention provides a method and an algorithm for reducing fringe print through, which is observed in optical path difference measurements.

A significant portion of the fringe print through may be due to polarizer leakage in the optics of an interferometer. This is evidenced by the dominant 1:1 component of the print through in simultaneous phase shifting instruments.

The fringe print through observed in optical path difference measurements is also observable in the modulation image formed from the four phase buckets. The modulation image may be defined as follows:

$$\text{gamma} = \frac{\text{peak-to-peak intensity modulation}}{\text{intensity normalizer}}$$

$$\text{gamma} = \frac{2[(y_4 - y_2)^2 + (y_1 - y_3)^2]^{1/2}}{y_1 + y_2 + y_3 + y_4}$$

where $y_1$, $y_2$, $y_3$ and $y_4$ are four phase buckets.

The equation is useful since the modulation is nominally constant across the image. Thus, a metric based on the variance in the modulation may be derived.

Nominally the phase of the optical path difference map (i.e. phase, or signal) may be found using the four phase buckets y1, y2, y3 and y4 (or A, B, C and D, respectively) as follows:

$$\text{phase} = \arctan[(y4-y2)/(y1-y3)] \quad (6)$$

The present invention assumes that some portion of the signals in the buckets of the numerator (y1, y3) of the arctangent expression leaks into the denominator (due to polarization leakage, misalignment, or unknown causes). Similarly, some portion of the signals in the buckets of the denominator (y2, y4) of the arctangent expression leak into the numerator.

In order to mitigate the effect of the leakage the present invention forms cancellation terms that reduce the effects of the leakage on the modulation and, consequently, the phase. As an example, a MATLAB code using only four linear coefficients are employed, is provided below. It will be appreciated, however, that other expressions, such as polynomial or trigonometric expansions that use any combination of terms for any combination of the four buckets, may be employed in the numerator or denominator. In the example described, a non linear optimizer is used to minimize the variance (VAR) in the modulation of the four fringe images (y1, y2, y3, y4), but other approaches may also be employed.

The following is the MATLAB code used as an example of an algorithm to find the crosstalk canceling coefficients for the signals in the four buckets:

function[o,gamma]=crosstalkcancelmerit(a,y1,y2,y3,y4);

where y1, y2, y3 and y4 are each vectors, or sample signals of the four fringe images, respectively, and a is a vector, as defined below.

intensity=y1+y2+y3+y4;

where the intensity is used as a modulation normalizer.

n1=y1-y3;

where n1 is the arctangent numerator of Equation (6).

d1=y4-y2;

where d1 is the arctangent denominator of Equation (6).

d1Cancel=a(1)*y2+a(2)*y4;

where d1Cancel is a cancellation term, and
a is a vector of the coefficients.

n1Cancel=a(3)*y1+a(4)*y3;

where n1Cancel is a cancellation term, and
a is a vector of the coefficients.

gamma=2*sqrt((d1-n1Cancel)^2+(n1-d1Cancel)^2))/intensity;

where gamma is the modulation.
o=VAR(gamma);
where o is the output of the variance (VAR) of the modulation.
END;
where END is the end of the MATLAB code.

The following is the MATLAB code which optimizes the coefficients of a:

[a,err,exitflag,output]=fminsearch(@(a)crosstalkcancelmerit(a,y1,y2,y3,y4),zeros(1,4));

where err, exitflag and output are flags, and a is the vector of the coefficients, which are minimized by iterating through the program, starting with values of zeros.

The following is the MATLAB code to implement a simple arctangent function with crosstalk compensation, in accordance with an embodiment of the present invention:

phase=arctangent[(d1-n1Cancel)/(n1-d1Cancel)]; (7)

where each of the terms is defined above.

The coefficients may be calculated infrequently. For example, they may be calculated during instrument calibration, or as often as desired during testing. Furthermore, this algorithm is complementary to, and may be used in conjunction with, any other noise mitigating techniques. Furthermore, this crosstalk cancellation algorithm may be used with a multiple wavelength, or broadband interferometer, regardless of the exact phase calculation used in the instrument.

Using the crosstalk cancellation algorithm, as exemplified above, the present invention provides reduced print through error. This result may be seen in FIG. 5, which is a graph of surface amplitude in nanometers (nm) versus pixel position along a sensor diagonal. The sensor used in the example is a 4D Phase Camera which is imaging a tilted flat mirror, such that there are 73 fringes observed along the diagonal in the plane of the fringe image.

Figure 5:
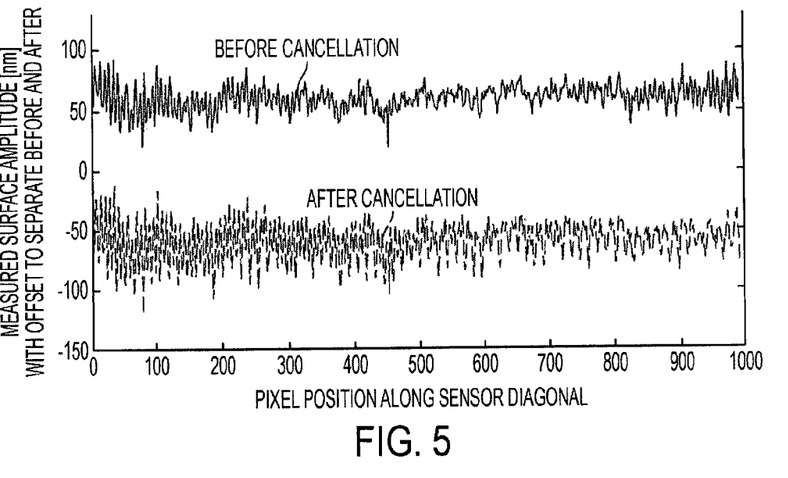
FIG. 5 is a plot of amplitude in nanometers versus pixel position along a sensor diagonal, depicting a comparison of the present invention with a conventional phase shifted interferometer.

Observing the line scans, depicted in FIG. 5, one may see that the crosstalk cancellation algorithm of the present invention has reduced the print through error by a factor of 2-3 over most of the scan. The upper curve shows the print through error before crosstalk cancellation and the bottom curve shows the print through error after crosstalk cancellation. The lower curve, in general, has a much lower error.

Figure 6:
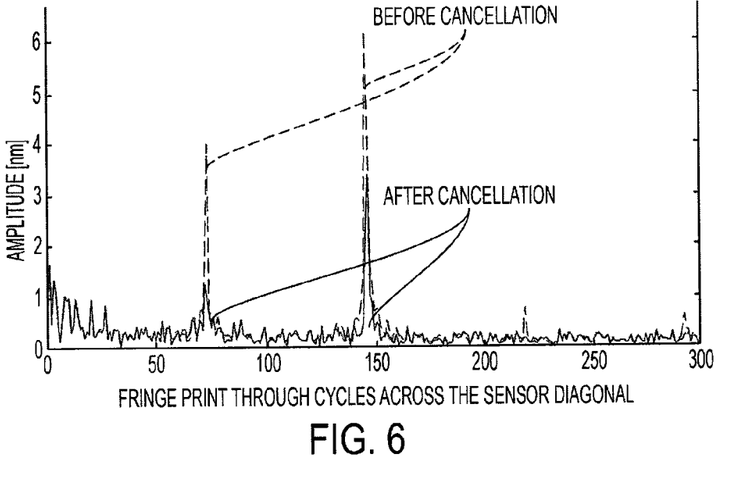
FIG. 6 is a spectral plot of the amplitude lines shown in FIG. 5, depicting a comparison of the present invention with a conventional phase shifted interferometer.

The improvement is also depicted in terms of spectral content in FIG. 6. As shown, the 1:1 frequency fringe print through amplitude (73 cycles/sensor) is reduced by a factor of 4, when using the algorithm of the present invention; similarly, the 2:1 frequency fringe print through amplitude (146 cycles/sensor) is reduced by a factor of 2 when using the algorithm. As may be seen, after the crosstalk cancellation, the peaks at 73 cycles and 146 cycles are much lower. It will be appreciated that the 1:1 frequency fringe print through reduction is more important, because the 2:1 fringe print through is more sensitive to vibration and, thus, easier to reduce by averaging using imperfectly planned vibration.

The present invention is useful for all simultaneous phase shifting (or polarization phase shifting) wavefront sensors, piston sensors, or interferometers. Applications using these sensors may include system wavefront testing, component surface testing, and speckle testing.

The previous example of a crosstalk cancellation algorithm is based on sampling all the pixels in the fringe images. As another example, the following algorithm, also executed in MATLAB, is provided, in which the crosstalk cancellation is based on sampling pixels along the diagonal of the fringe images:

$$\text{function}[o,\text{gamma}]=\text{crosstalkcancelfftmerit}(a,y1,y2,y3,y4);$$

where y1, y2, y3 and y4 are each vectors, or sample signals of the four fringe images, respectively, which are sampled along the diagonal of each fringe image, and $$fr\text{Bin}=73$$

where frBin is the frequency bin.

$$\text{intensity}=y1+y2+y3+y4;$$

where the intensity is used as a modulation normalizer.

$$n1=y1-y3;$$

where n1 is the arctangent numerator of Equation (6).

$$d1=y4-y2;$$

where d1 is the arctangent denominator of Equation (6).

$$d1\text{Cancel}=a(1)*y2+a(2)*y4;$$

where d1Cancel is a cancellation term, and
a is a vector of the coefficients.

$$n1\text{Cancel}=a(3)*y1+a(4)*y3;$$

where n1Cancel is a cancellation term, and
a is a vector of the coefficients.

$$\text{gamma}=2*\text{sqrt}((d1-n1\text{Cancel})^2+(n1-d1\text{Cancel})^2))/\text{intensity};$$

where gamma is the modulation.

$$\text{gamma}(\text{isnan}(\text{gamma}))=0;$$

where bad data is zeroed out.

$$tmp=fft(\text{gamma});$$

where tmp is a temporary function, and
fft is a Fast Fourier transform.

$$o=\text{sum}(abs(tmp(fr\text{Bin})));$$

where o is the output, and
the sampled spectral peak at 1:1 fringe print through is selected based on 73 values; the output is summed over the absolute values.

END.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method of minimizing fringe print-through in a phase-shifting interferometer, comprising the steps of:
   (a) determining multiple transfer functions of pixels in the phase-shifting interferometer;
   (b) computing a crosstalk term for each transfer function, and
   (c) displaying, to a user, a phase-difference map using the crosstalk terms computed in step (b),
   wherein computing crosstalk terms in step (b) includes computing an N-dimensional vector, where N corresponds to the number of transfer functions, and
   the N-dimensional vector is obtained by minimizing a variance of a modulation function, and
   wherein N has a value of four, and
   the modulation function, defined as gamma, includes the following relationship:

$$\text{gamma}=2*\text{sqrt}((d1-n1\text{Cancel})^2+(n1-d1\text{Cancel})^2))/\text{intensity};$$

in which:
n1=y1−y3;
d1=y4−y2;
d1Cancel=a(1)*y2+a(2)*y4;
where d1Cancel is a cancellation term, and
a is a vector of the coefficients, y1, y2, y3 and y4;

$$n1\text{Cancel}=a(3)*y1+a(4)*y3;$$

where n1Cancel is a cancellation term, and
a is a vector of the coefficients, y1, y2, y3 and y4;

$$\text{intensity}=y1+y2+y3+y4; \text{ and}$$

y1, y2, and y4 are four interferogram images.

2. The method of claim 1 wherein the phase-shifting interferometer includes a reference beam and a test beam, and determining a transfer function in step (a) includes
   measuring intensities of the reference beam and the test beam at each pixel, and measuring an optical path difference between the reference beam and the test beam at each pixel.

3. The method of claim 2 wherein determining the transfer function includes solving the following mathematical relationship:

$$F(x,y)=\frac{1}{2}(I_r+I_s+2\sqrt{I_rI_s}\cos(\Delta\phi(x,y)))$$

where F is a transfer function at pixel location (x,y);
$I_r$(x, y) and $I_s$(x, y) are intensities of reference and test wavefronts of the phase shifting interferometer, at each (x,y) coordinate in the image, respectively; and
$\Delta\phi$(x,y) is an optical path difference between the reference and test wavefronts.

4. The method of claim 2 wherein
each pixel includes pixels along a diagonal in an image array of the phase-shifting interferometer.

5. The method of claim 1 wherein determining multiple transfer functions in step (a) includes obtaining N interferograms, where N corresponds to N transfer functions, and
each interferogram has a total number of pixels equal to (n×m)/N,
where n and m are the number of pixels in a detector array of the phase-shifting interferometer.

6. The method of claim 1 wherein displaying the phase difference-map is based on the following expression:

$$phase=\arctan[(d1-n1Cancel)/(n1-d1Cancel)].$$

7. The method of claim 1 further including the following step:
(d) combining pixels having similar transfer functions to generate a single image per transfer function.

8. A processor containing a set of instructions for minimizing fringe print-through in a phase-shifting interferometer, The instructions comprising the steps of:
(a) determining multiple transfer functions of pixels in the phase-shifting interferometer;
(b) computing a crosstalk term for each transfer function, and
(c) displaying, to a user, a phase-difference map using the crosstalk terms computed in step (b), wherein a modulation image, defined as gamma, includes the following relationship:

$$gamma=2*sqrt((d1-n1Cancel)^2+(n1-d1Cancel)^2))/intensity;$$

in which:
n1=y1−y3;
d1=y4−y2;
d1Cancel=a(1)*y2+a(2)*y4;
where d1Cancel is a cancellation term, and
a is a vector of the coefficients, y1, y2, y3 and y4;

$$n1Cancel=a(3)*y1+a(4)*y3;$$

where n1Cancel is a cancellation term, and
a is a vector of the coefficients, y1, y2, y3 and y4;

intensity=y1+y2+y3+y4; and y1, y2, y3 and y4 are four phase shifted images.

9. The processor of claim 8 including the following steps:
(d) forming a modulation function that includes the transfer functions computed in step (a); and
(e) minimizing a variance of the modulation function.

10. The processor of claim 9 wherein
the crosstalk term for each transfer function includes a value multiplied by at least one transfer function determined in step (a).

11. The processor of claim 8 wherein the phase-shifting interferometer includes a reference beam and a test beam, and
determining a transfer function in step (a) includes
measuring intensities of the reference beam and the test beam at each pixel, and
measuring an optical path difference between the reference beam and the test beam at each pixel.

12. The processor of claim 8 wherein
determining multiple transfer functions of pixels includes:
measuring intensities of pixels of an image array in the phase-shifting interferometer.

13. The processor of claim 8 wherein
determining multiple transfer functions of pixels includes:
measuring intensities of pixels along a diagonal of an image array in the phase-shifting interferometer.

* * * * *